Feb. 2, 1943   J. W. DAWSON   2,309,629
CONDENSER WELDING SYSTEM
Filed July 3, 1940

INVENTOR.
JOHN W. DAWSON,
BY Elmer J. Gorn
ATTY.

Patented Feb. 2, 1943

2,309,629

UNITED STATES PATENT OFFICE 2,309,629

CONDENSER WELDING SYSTEM

John W. Dawson, Auburndale, Mass., assignor to Raytheon Manufacturing Company, Newton, Mass., a corporation of Delaware Application July 3, 1940, Serial No. 343,786

7 Claims. (Cl. 171—97)

This invention relates to condenser welding systems, and more particularly to such systems in which electrical energy is stored in a condenser and then discharged into a resistance welding load by a substantially unidirectional pulse of current. Such a system is described and claimed in my copending application, Serial No. 309,124, filed December 14, 1939.

An object of this invention is to provide a simplification of a system of the foregoing type in which the operation occurs in a reliable manner.

The foregoing and other objects of this invention will be best understood from the following description of an exemplification thereof, reference being had to the accompanying drawing, wherein.

Figure 1:
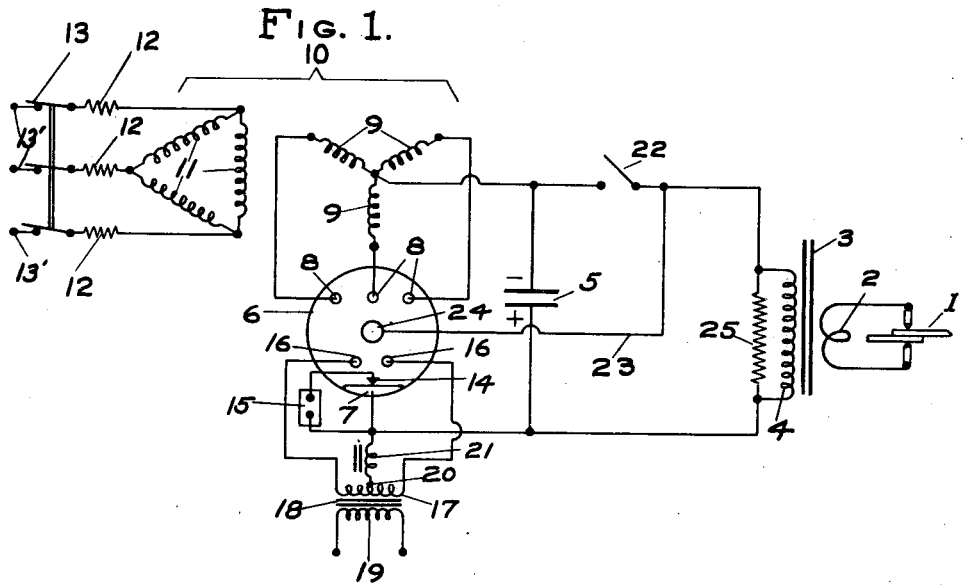
Fig. 1 is a diagram of a condenser welding system embodying my invention.

In the embodiment illustrated, welding current is to be supplied to a resistance welding load 1 from the secondary winding 2 of a welding transformer 3, whose primary winding 4 is adapted to be supplied with a pulse of welding current from an electrical energy storage device, such as a condenser 5. The condenser 5 is adapted to be charged with direct current of suitable voltage from a rectifying tube 6 having a cathode 7, preferably of the continuously energized type. In Fig. 1 this cathode is illustrated diagrammatically as a mercury pool cathode. The tube 6 is provided with a plurality of anodes 8 connected respectively to the outer ends of star-connected secondary windings 9 of a plural-phase transformer 10. The transformer 10 is provided with a primary winding 11, preferably connected in delta. Said primary winding is connected through impedances 12 which are preferably resistances, and a line switch 13 to terminals 13', which are adapted to be energized from a suitable source of plural-phase alternating current. Although I have illustrated the rectifyng tube 6 as provided with three anodes 8 so as to rectify three-phase alternating current, it is to be understood that any number of phases and corresponding number of anodes may be utilized in order to supply the condenser 5 with charging current.

The neutral point of the secondary windings 9 is connected to the negative side of the condenser 5, while the cathode 7 is connected to the positive side thereof. In order to start an arc spot on the cathode 7, a starting electrode of any suitable type, indicated at 14, may be utilized. This is connected through a starting impulse source 15 back to the cathode 7. In order that the cathode 7 be continuously energized, as indicated above, two holding anodes 16—16 are provided to pick up and maintain the arc spot initiated by the starting electrode 14. The holding anodes 16 are connected to opposite sides of a secondary winding 17 of an auxiliary transformer 18 whose primary 19 is energized from a suitable source of alternating current. The secondary winding 17 is provided with a center tap 20 which is connected to the cathode 7 through a maintaining choke 21, having sufficient resistance to limit the current flow.

Interposed between the negative side of the condenser 5 and the primary winding 4 of the welding transformer is a welding control switch 22 which is normally maintained in an open position between welding operations. A conductor 23 extends from the side of the welding control switch 22 adjacent the primary winding 4 to an additonal anode 24. In order to prevent the appearance of any excessive transient voltages across the primary winding 4 or on the additonal anode 24, a resistance 25 may be connected across the primary winding 4.

The operation of the system is initiated by energizing the cathode 7 as described above. The line switch 13 is then closed, whereupon the anodes 8 rectify the three-phase alternating current supplied thereto, and charge the condenser 5 to the proper polarity and voltage value. The rate of charging is determined primarily by the impedances 12. In some instances the windings of the transformer 10 may be designed to supply sufficient impedance for this purpose. When the condenser 5 is charged to the proper value and the electrodes of the resistance welding load 1 are closed upon the work to be welded, the switch 22 is closed.

Figure 2:
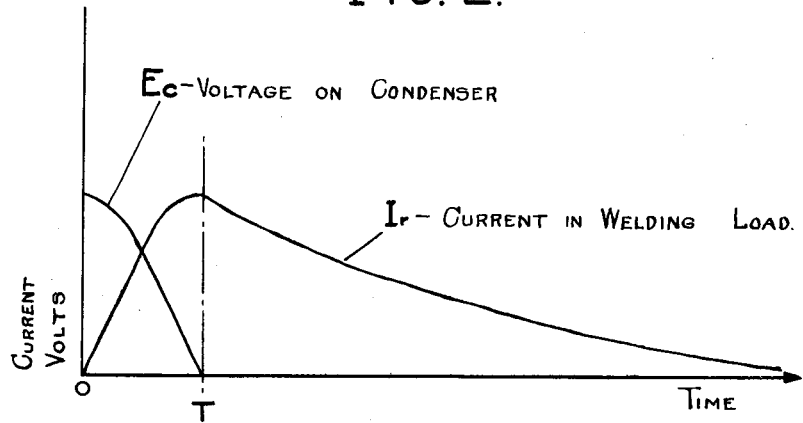
Fig. 2 is a set of curves illustrating the mode of operation of the arrangement as illustrated in Fig. 1.

The operation of the system which ensues upon closing of the switch 22 will be better understood in connection with Fig. 2, in which $E_c$ represents the voltage across the condenser 5, and $I_r$ represents the current in the welding load. Before the switch 22 is closed, the voltage $E_c$ on the condenser 5 will have reached the maximum value, as represented in Fig. 2, due to the charging current supplied thereto as described above. When switch 22 is closed, it will be noted that the voltage of the condenser is impressed between the cathode 7 and the additonal anode 24. However, this voltage is impresed in the non-conducting operation, and therefore no current flows in the conductor 23. The condenser 5 starts to discharge through the primary winding 4, and the welding current I_r starts to rise, as indicated in Fig. 2. At the same time the voltage $E_c$ on the condenser 5 starts to fall. At substantially the time T, the voltage $E_c$ falls to zero and tends to reverse, due to the fact that the discharge circuit contains inductance and is generally oscillatory. At the same time the current $I_r$ rises to its maximum value. When the voltage $E_c$ tends to reverse, the voltage on the anode 24 likewise tends to reverse, and since this voltage is then applied in the conducting direction, a discharge current starts to flow from the additional anode 24, establishing a low impedance shunt circuit across the primary winding 4. This causes the welding current $I_r$ to decrease exponentially, as shown in Fig. 2, after the time T. The foregoing operation, in which the welding current rises sharply and then decreases substantially exponentially, is more fully described and claimed in my said copending application, Serial No. 309,124.

Due to the fact that the additional anode 24 is connected on the welding transformer side of the welding control switch 22, said anode does not have impressed upon it inverse voltages of any substantial magnitude, except for a very brief instant after the closing of the switch 22, when the voltage on the condenser 5 starts to fall off quite rapidly. Thus there is very little danger of flashback in the tube 6 to the anode 24. In order further to avoid the appearance of high voltage surges across the transformer primary winding 4, upon inadvertent opening of the resistance welding load circuit, the switch 22 may be maintained in the closed position until after the welding electrodes have opened the circuit at the load 1. Under these conditions, when the welding load is opened, any voltage surges which tend to be generated in the primary 4 are absorbed in the condenser 5, which thereby will acquire a very slight charge. Such operation can be carried out whenever the desired welding speed is of the proper value, so that sufficient time is available to charge the condenser 5 after the switch 22 is re-opened. Also in some instances it may be desirable to open the line switch 13 when the condenser 5 has been charged to the desired value. This operation would avoid any undesirable currents from being supplied from the rectifier anodes 8 to the welding load during the time switch 22 is maintained in the closed position. However, in many instances the impedances 12 will be of sufficient value to prevent the magnitude of such current from rising to undesirable values.

Of course it is to be understood that this invention is not limited to the particular details as described above inasmuch as many equivalents will suggest themselves to those skilled in the art. For example, the cathode 7 instead of being of the mercury pool type could be of any other continuously energized type capable of supplying the necessary values to discharge current. Also the anodes 8 instead of being of the uncontrolled type could be provided with control, such as grids, in order that the charging current might be regulated. Various other ideas as to the utilization of the features described herein will suggest themselves to those skilled in the art.

It is accordingly desired that the appended claims be given a broad interpretation commensurate with the scope of the invention within this art.

What is claimed is:

1. A system comprising an electrical energy storage device, a rectifying discharge tube, said tube comprising a cathode and an anode adapted to be supplied with alternating current and connected to said storage device for supplying rectified storage energy thereto, a load circuit, means for discharging the energy stored in said storage device into said load circuit comprising circuit-closing means connected between the negative side of said storage device and a point on said load circuit, said tube containing an additional anode, said additional anode and said cathode being connected to points of opposite polarity on said load circuit.

2. A system comprising an electrical energy storage device, a rectifying discharge tube, said tube comprising a cathode and an anode adapted to be supplied with alternating current and connected to said storage device for supplying rectified storage energy thereto, a load circuit, means for discharging the energy stored in said storage device into said load circuit comprising circuit-closing means connected between the negative side of said storage device and a point on said load circuit, said tube containing an additional anode, said additional anode and said cathode being connected to establish a shunt circuit across said load circuit upon the occurrence of a discharge between said additional electrode and said cathode.

3. A system comprising an electrical energy storage device, a rectifying discharge tube, said tube comprising a cathode of the continuously energized type and an anode adapted to be supplied with alternating current and connected to said storage device for supplying rectified storage energy thereto, a load circuit, means for discharging the energy stored in said storage device into said load circuit comprising circuit-closing means connected between the negative side of said storage device and a point on said load circuit, said tube containing an additional anode, said additional anode and said cathode being connected to establish a shunt circuit across said load circuit upon the occurrence of a discharge between said additional electrode and said cathode.

4. A system comprising an electrical energy storage device, a rectifying discharge tube, said tube comprising a cathode and a plurality of anodes adapted to be supplied with plural-phase alternating current and connected to said storage device for supplying rectified storage energy thereto, a load circuit, means for discharging the energy stored in said storage device into said load circuit comprising circuit-closing means connected between the negative side of said storage device and a point on said load circuit, said tube containing an additional anode, said additional anode and said cathode being connected to establish a shunt circuit across said load circuit upon the occurrence of a discharge between said additional electrode and said cathode.

5. A system comprising a condenser, a rectifying discharge tube, said tube comprising a cathode and an anode adapted to be supplied with alternating current and connected to said condenser for supplying rectified charging current thereto, a load circuit, means for discharging the energy stored in said condenser into said load circuit comprising circuit-closing means connected between the negative side of said storage device and a point on said load circuit, said tube containing an additional anode, said additional anode and said cathode being connected to establish a shunt circuit across said load circuit upon the occurrence of a discharge between said additional electrode and said cathode.

6. A system comprising an electrical energy storage device, a rectifying discharge tube, said tube comprising a cathode and an anode adapted to be supplied with alternating current and connected to said storage device for supplying rectified storage energy thereto, a load circuit, circuit-closing means connected between the negative side of said storage device and a point on said load circuit for discharging the energy stored in said storage device into said load circuit, said tube containing an additional anode, said additional anode and said cathode being connected to said load circuit to substantially prevent said load circuit from feeding energy back to said storage device, said circuit-closing means being related to said additional anode to prevent application of substantial voltage to said additional anode until after the discharge of said energy storage device has been initiated.

7. A system comprising an electrical energy storage device, a rectifying discharge tube, said tube comprising a cathode and an anode adapted to be supplied with alternating current and connected to said storage device for supplying rectified storage energy thereto, a load circuit, circuit-closing means connected between the negative side of said storage device and a point on said load circuit for discharging the energy stored in said storage device into said load circuit, said tube containing an additional anode, said additional anode and said cathode being connected to said load circuit to prevent said load circuit from feeding energy back to said storage device, said circuit-closing means being interposed between said energy storage means and said additional anode.

JOHN W. DAWSON.